United States Patent
Song et al.

(10) Patent No.: US 9,723,277 B2
(45) Date of Patent: Aug. 1, 2017

(54) PROJECTION METHOD, PROJECTION APPARATUS AND ELECTRONIC DEVICE

(71) Applicants: Beijing Lenovo Software Ltd., Beijing (CN); Lenovo (Beijing) Co., Ltd., Beijing (CN)

(72) Inventors: Qiang Song, Beijing (CN); Xiangbo Lv, Beijing (CN); Jianguo Li, Beijing (CN); Kai Cheng, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 0 days.

(21) Appl. No.: 14/974,504

(22) Filed: Dec. 18, 2015

(65) Prior Publication Data
US 2016/0330416 A1    Nov. 10, 2016

(30) Foreign Application Priority Data
May 6, 2015    (CN) .......................... 2015 1 0226710

(51) Int. Cl.
*H04N 9/31* (2006.01)
*G03B 21/20* (2006.01)
*G03B 21/14* (2006.01)

(52) U.S. Cl.
CPC .............. *H04N 9/31* (2013.01); *G03B 21/14* (2013.01); *G03B 21/208* (2013.01); *H04N 9/3173* (2013.01)

(58) Field of Classification Search
CPC .... G03B 21/28; G03B 21/147; G03B 21/208; G03B 21/2053; G03B 21/2033; H04N 9/3129; H04N 9/3161; H04N 9/3185; H04N 9/3194
See application file for complete search history.

(56) References Cited

U.S. PATENT DOCUMENTS

| | | | |
|---|---|---|---|
| 2009/0296049 A1* | 12/2009 | Teradaira ............... | G02B 13/22 353/98 |
| 2010/0007852 A1* | 1/2010 | Bietry .................... | G03B 21/28 353/8 |
| 2012/0113399 A1* | 5/2012 | Yeom ................... | H04N 9/3182 353/85 |

(Continued)

*Primary Examiner* — Sultan Chowdhury
(74) *Attorney, Agent, or Firm* — Harness, Dickey & Pierce, P.L.C.

(57) ABSTRACT

A projection method, a projection apparatus and an electronic device are provided. The method may include: acquiring a target content to be projected in an electronic device; determining a projection parameter for the target content; adjusting a beam output mode of a light path changing module for projection beams of the target content based on the projection parameter; and based on the beam output mode, projecting, via the light path changing module, the projection beams of the target content into a first region of a projection carrier located away from the electronic device by a first distance, where the area of the first region varies with the beam output mode. With the projection method, the projection apparatus and the electronic device in the application, the area of the projection region can be adjusted easily, so that multiple users can use the electronic device to watch the projection conveniently.

15 Claims, 6 Drawing Sheets

(56) References Cited

U.S. PATENT DOCUMENTS

2014/0092369 A1* 4/2014 Seno .................. G03B 21/2033
                                                          353/69
2014/0253883 A1* 9/2014 Akamatsu ............ G03B 21/142
                                                          353/85

* cited by examiner

PROJECTION METHOD, PROJECTION APPARATUS AND ELECTRONIC DEVICE

CROSS REFERENCES OF RELATED APPLICATION

The present application claims the priority to Chinese Patent Application No. 201510226710.0, entitled "PROJECTION METHOD, PROJECTION APPARATUS AND ELECTRONIC DEVICE", filed on May 6, 2015 with the State Intellectual Property Office of the People's Republic of China, which is incorporated herein by reference in its entirety.

FIELD

The present application relates to a field of information processing technologies, and more particularly to a projection method, a projection apparatus and an electronic device.

BACKGROUND

It has become fashionable to watch a video or an image on an electronic device such as a cell-phone or a tablet computer. Since the electronic device such as the cell-phone or the tablet computer has a screen with small area, a content displayed on the electronic device cannot be watched by multiple users at the same time due to such a limitation from the screen of the electronic device. To enable multiple users to watch the content displayed on the electronic device at the same time, the electronic device may be connected to a projector, to project the content displayed on the electronic device via the projector, so that the content displayed on the electronic device can be watched by multiple users at the same time. However, since the projector is unsuitable for movement and not provided in most families, multiple users can only watch the content displayed on the electronic device in turn, thereby causing inconveniences in watching.

SUMMARY

In view of this, a projection method, a projection apparatus and an electronic device are provided in the application, to enable multiple users to watch the content based on one electronic device at the same time.

To achieve the above target, following solutions are provided in the application. A projection method is provided, which includes:

acquiring a target content to be projected in an electronic device;

determining a projection parameter for projecting the target content;

adjusting a beam output mode of a light path changing module for projection beams of the target content based on the projection parameter; and based on the beam output mode, projecting, via the light path changing module, the projection beams of the target content into a first region of a projection carrier which is located away from the electronic device by a first distance, where the area of the first region varies with the beam output mode.

Preferably, the light path changing module may have multiple refractive indices and/or reflective indices; and the determining the projection parameter for projecting the target content may include:

determining a beam changing parameter of the projection beams of the target content at the light path changing module, where the beam changing parameter includes the projection beams being refracted and a target refractive index thereof, or the projection beams being reflected and a target reflective index thereof.

Preferably, the adjusting the beam output mode of the light path changing module for the projection beams of the target content based on the projection parameter may include:

based on the beam changing parameter, adjusting, to be the target refractive index or the target reflective index, the refractive index of the light path changing module in a direction in which the projection beams are to be projected.

Preferably, the light path changing module may be an electro-refractive index changing typed light transmitting body;

the beam changing parameter may include the projection beams being refracted and a target refractive index thereof; and the adjusting the beam output mode of the light path changing module for the projection beams of the target content based on the projection parameter may include:

adjusting a voltage applied on the light transmitting body to be a target voltage based on the target refractive index, to adjust the refractive index of the light transmitting body at the target voltage to be the target refractive index.

Preferably, the light transmitting body may be a polyhedron, and the light transmitting body may have at least one pair of surfaces being a light transmitting surface, with the pair of surfaces including two opposite surfaces of the polyhedron; and the adjusting the voltage applied on the light transmitting body to be the target voltage based on the target refractive index, to adjust the refractive index of the light transmitting body at the target voltage to be the target refractive index may include:

setting the voltage applied on the light transmitting body to be the target voltage based on the target refractive index and adjusting the direction in which the projection beams are to be projected to be identical to the direction in which the pair of light transmitting surfaces of the light transmitting body are located.

Preferably, the light transmitting body may have at least one surface being a light reflecting surface;

the beam changing parameter may further include the projection beams being reflected and a target reflective index thereof; and the adjusting the beam output mode of the light path changing module for the projection beams of the target content based on the projection parameter may further include:

determining a target reflecting surface among the at least one light reflecting surface based on the target reflective index and adjusting the direction in which the projection beams are to be projected to be toward the target reflecting surface.

Preferably, the light path changing module may be a polyhedron having surfaces with different reflective indices;

the beam changing parameter may include the projection beams being reflected and a target reflective index thereof; and the adjusting the beam output mode of the light path changing module for the projection beams of the target content based on the projection parameter may include:

setting one surface of the surfaces of the polyhedron with a reflective index being the target reflective index as a surface on which the projection beams are to be projected, and adjusting the surface on which the projection beams are to be projected to be in the direction in which the projection beams are to be projected.

In another aspect, a projection apparatus is further provided in the application, which includes:

a content acquiring unit configured to acquire a target content to be projected in an electronic device;

a parameter determining unit configured to determine a projection parameter for projecting the target content;

an output adjusting unit configured to adjust a beam output mode of a light path changing module for projection beams of the target content based on the projection parameter; and a projecting unit configured to, based on the beam output mode, project, via the light path changing module, the projection beams of the target content into a first region of a projection carrier which is located away from the electronic device by a first distance, where the area of the first region varies with the beam output mode.

Preferably, the light path changing module may have multiple refractive indices and/or reflective indices; and the parameter determining unit may include a parameter determining sub-unit configured to determine a beam changing parameter of the projection beams of the target content at the light path changing module, where the beam changing parameter may include the projection beams being refracted and a target refractive index thereof, or the projection beams being reflected and a target reflective index thereof.

Preferably, the output adjusting unit may include an output direction adjusting unit configured to, based on the beam changing parameter, adjust, to be the target refractive index or the target reflective index, the refractive index of the light path changing module in a direction in which the projection beams are to be projected.

Preferably, the light path changing module may be an electro-refractive index changing typed light transmitting body;

the beam changing parameter determined by the parameter determining sub-unit may include the projection beams being refracted and a target refractive index thereof; and the output adjusting unit may include a first output adjusting unit configured to adjust a voltage applied on the light transmitting body to be a target voltage based on the target refractive index, to adjust the refractive index of the light transmitting body at the target voltage to be the target refractive index.

Preferably, the light transmitting body may be a polyhedron, and the light transmitting body may have at least one pair of surfaces being a light transmitting surface, with the pair of surfaces including two opposite surfaces of the polyhedron; and the first output adjusting unit may include a first output adjusting sub-unit configured to set the voltage applied on the light transmitting body to be the target voltage based on the target refractive index and adjust the direction in which the projection beams are to be projected to be identical to a direction in which the pair of light transmitting surfaces of the light transmitting body are located.

Preferably, the light transmitting body may have at least one surface being a light reflecting surface;

the beam changing parameter may include the projection beams being reflected and a target reflective index thereof; and the first output adjusting unit may further include a second output adjusting sub-unit configured to determine a target reflecting surface among the at least one light reflecting surface based on the target reflective index and adjust the direction in which the projection beams are to be projected to be toward the target reflecting surface.

Preferably, the light path changing module may be a polyhedron having surfaces with different reflective indices;

the beam changing parameter may include the projection beams being reflected and a target reflective index thereof; and the output adjusting unit may include a second output adjusting unit configured to set one surface of the polyhedron with a reflective index being the target reflective index as a surface on which the projection beams are to be projected, and adjust the surface on which the projection beams are to be projected to be in the direction in which the projection beams are to be projected.

In another aspect, an electronic device is further provided in the application, which includes a processor, a micro projection chip, a light projection outlet and a light path changing module provided in the electronic device and facing the light projection outlet, where the processor is connected to the micro projection chip and the light path changing module;

the processor is configured to acquire a target content to be projected in the electronic device and determine a projection parameter for the target content, adjust a beam output mode of the light path changing module for projection beams of the target content based on the projection parameter, and control, based on the beam output mode, the micro projection chip to project the target content; and the micro projection chip is configured to, under the control of the processor, project the projection beams of the target content into a first region of a projection carrier which is located away from the electronic device by a first distance via the light path changing module and the light projection outlet, where the area of the first region varies with the beam output mode.

Preferably, the light path changing module may be an electro-refractive index changing typed light transmitting body;

the projection parameter may include the projection beams being refracted via the light path changing module and a target refractive index thereof; and the processor being configured to adjust the beam output mode of the light path changing module for the projection beams of the target content based on the projection parameter may include the processor being configured to adjust a voltage applied on the light transmitting body to be a target voltage based on the target refractive index, to adjust the refractive index of the light transmitting body at the target voltage to be the target refractive index.

Preferably, the light transmitting body may be a polyhedron, and the light transmitting body may have at least one pair of surfaces being a light transmitting surface, with the pair of surfaces including two opposite surfaces of the polyhedron; and the processor being configured to adjust the voltage applied on the light transmitting body to be the target voltage based on the target refractive index may include the processor being configured to set the voltage applied on the light transmitting body to be the target voltage based on the target refractive index and adjust the pair of light transmitting surfaces of the light transmitting body to be toward the direction in which the projection beams are to be projected.

Preferably, the light transmitting body may have at least one surface being a light reflecting surface;

the beam changing parameter may further include the projection beams being reflected and a target reflective index thereof; and the processor being configured to adjust the beam output mode of the light path changing module for the projection beams of the target content based on the projection parameter may further include determining a target reflecting surface among the at least one light reflecting surface based on the target reflective index and adjusting the direction in which the projection beams are to be projected to be toward the target reflecting surface.

It can be seen from the above technical solutions that, to project the projection beams of the target object by using the electronic device, the projection beams are transmitted through the light path changing module and then projected onto the projection carrier. The change in the path of the projection beams by the light path changing module varies with the beam output mode of the light path changing module, so that an angle between the projection beams projected from the light path changing module and the projection carrier is variable. Therefore, in the case where the distance between the electronic device and the projection carrier is unchanged, an area of the projection of the target object on the projection carrier is variable with the beam output mode, thereby changing the area of the projection flexibly. In this way, the area of the projection can be adjusted based on the number of the users, thereby facilitating the users to watch the projection.

BRIEF DESCRIPTION OF THE DRAWINGS

Appended drawings to be used in the description of the embodiments will be described briefly as follows, so that technical solutions according to the embodiments of the present application will become clearer. It is obvious that the appended drawings in the following description only illustrate some embodiments of the present application. For those skilled in the art, other appended drawings may be obtained according to these appended drawings without any creative work.

DETAILED DESCRIPTION OF EMBODIMENTS

Technical solutions in embodiments of the present application will be described clearly and completely hereinafter in conjunction with drawings in the embodiments of the present application. Apparently, the described embodiments are only a part of rather than all of the embodiments of the present application. Any other embodiments obtained by those ordinary skilled in the art based on the embodiments of the present application without creative effort shall fall within the scope of protection of the present application.

Figure 1:
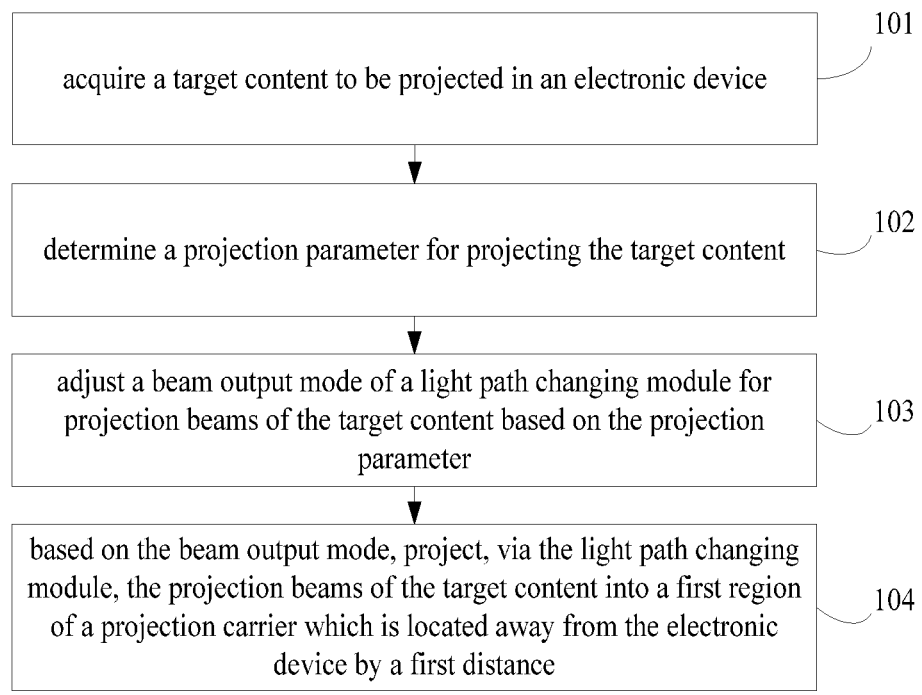
FIG. 1 shows a schematic flowchart of an embodiment of a projection method according to the application.

Referring to FIG. 1, which shows a schematic flowchart of an embodiment of a projection method according to the application, the method in this embodiment may include steps 101 to 104 as follows.

In 101, a target content to be projected in an electronic device is acquired.

There may be various target contents to be projected, such as an image, a document, a video, and a PPT.

The electronic device may be a cell-phone, a tablet computer, a handheld computer or the like.

In 102, a projection parameter for projecting the target content is determined.

In an embodiment of the application, the projection parameter may be parameter information representative of a projection angle, a beam direction, a beam path of projection beams of the target content and the like.

The projection parameter may be set by the user. The projection parameter may also be determined by the electronic device based on the target content to be projected, for example, different projection parameters may be set for different types of target contents.

In 103, a beam output mode of a light path changing module for the projection beams of the target content is adjusted based on the projection parameter.

The light path changing module is configured to change the transmission path of the projection beams. For example, the path of the projection beams may be changed when the projection beams are projected onto a surface of the light path changing module. For another example, the path of the projection beams is changed inside the light path changing module.

In the case where the beam output mode of the light path changing module for the projection beams may be determined according to the projection parameter for projecting the target content, the light path changing module is switched into the corresponding beam output mode.

In 104, based on the beam output mode, the projection beams of the target content is projected, via the light path changing module, onto a first region of a projection carrier which is located away from the electronic device by a first distance.

The area of the first region varies with the beam output mode.

The projection carrier may be any conventional carrier capable of carrying a projection image. For example, the projection carrier may be a projection screen, a wall or the like.

It is to be appreciated that, the projection beams of the target content is not a single beam, but one or more layers of beam planes consisting of multiple projection beams within a certain region.

In an embodiment of the application, to project the target content, each of the projection beams of the target content passes through the light path changing module, and then is projected onto the projection carrier.

Since the projection of the projection beams toward the light path changing module and the transmission of the projection beams through the light path changing module each are based on the current beam output mode of the light path changing module, and a way and an extent where the light path changing module changes the light path of the projection beams vary with the beam output mode, there exhibit variations for the path of the projection beams output from the light path changing module. It is to be appreciated that, in the case where the distance between the projection carrier and the electronic device is unchanged, the area of the projection region of the target content on the projection carrier varies with the angle between the projection beams projected from the light path changing module and the projection carrier. Thus, the area of the projection beams projected from the light path changing module onto the projection carrier may be changed by changing the light projection path of the projection beams.

It can be seen that, the light path output mode of the light path changing module may be adjusted as required, so as to adjust the area of the projection image.

In an embodiment of the application, to project the projection beams of the target object by using the electronic device, the projection beams are transmitted through the light path changing module and then projected onto the projection carrier. The change in the path of the projection beams by the light path changing module varies with the beam output mode of the light path changing module, so that an angle between the projection beams projected from the light path changing module and the projection carrier is variable. Therefore, in the case where the distance between the electronic device and the projection carrier is unchanged, an area of the projection of the target object on the projection carrier is variable with the beam output mode, thereby changing the area of the projection flexibly. In this way, the area of the projection can be adjusted based on the number of the users, thereby facilitating the users to watch the projection.

It is to be appreciated that, in any one of embodiments of the application, a micro optical projection assembly may be built-in the electronic device, for projecting the target content in a form of projection beams.

It is to be noted that, in an embodiment of the application, the light path changing module may be in multiple forms. For example, the light path changing module is a hollow polyhedron with at least two pairs of opposite light transmitting surfaces. That is to say, the hollow polyhedron may have at least two light transmitting paths, and the projection beams may be projected into the polyhedron from any one of the light transmitting surfaces. Each of the inner surfaces of the polyhedron is a plane mirror. With this, when the projection beams are projected into the polyhedron from a light transmitting surface, the projection beams will be reflected by the plane mirror and thus the projection path thereof is changed, so that the angle between the projection beams and the projection carrier is changed after the projection beams are projected out of the polyhedron at another light transmitting surface finally. The light projection path of the projection beams after being reflected inside the polyhedron and projected out of the polyhedron varies with the light transmitting surface at which the projection beams are projected into the polyhedron, thereby changing the area of the projection of the target object.

Figure 2:
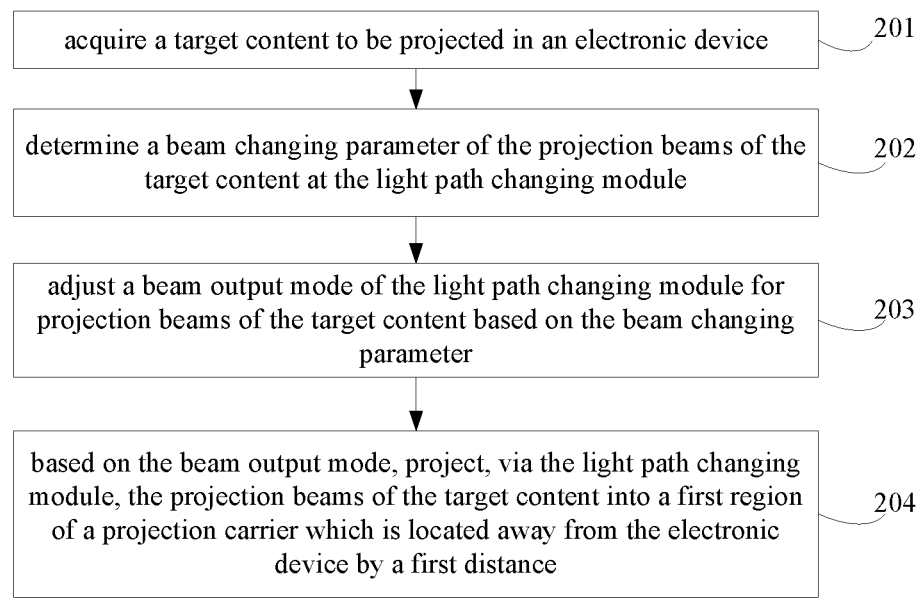
FIG. 2 shows a schematic flowchart of another embodiment of a projection method according to the application.

Optionally, considering that the light path may be changed by using the light refraction or reflection principle, the light path changing module in an embodiment of the application may have multiple refractive indices and/or reflective indices. Referring to FIG. 2, which shows a schematic flowchart of another embodiment of a projection method according to the application, the method in this embodiment may include steps 201 to 204 as follows.

In 201, a target content to be projected in an electronic device is acquired.

In 202, a beam changing parameter of the projection beams of the target content at the light path changing module is determined.

The beam changing parameter includes projection beams being refracted and a target refractive index thereof, or projection beams being reflected and a target reflective index thereof.

In an embodiment of the application, the light path changing module may reflect or refract the projection beams. Therefore, the beam changing mode of the projection beams of the target content at the light path changing module and the changing rate thereof may be determined.

In 203, a beam output mode of the light path changing module for the projection beams of the target content is adjusted, based on the beam changing parameter.

In the case where the beam changing parameter is the projection beams being refracted, the adjusting the beam output mode of the light path changing module includes refracting the projection beam after projecting the projection beams onto or into the light path changing module, and setting the refractive index of the light path changing module for the projection beams to be the target refractive index.

In the case where the beam changing parameter is the projection beams being reflected, the adjusting the beam output mode of the light path changing module includes reflecting the projection beams, so that the projection beams are reflected at the target reflective index after the projection beams are projected onto or into the light path changing module.

It is to be appreciated that, the light path changing module may have multiple beam output paths, and different beam output paths have different beam output modes for the projection beams. For example, lens with different refractive indices may be built-in respectively in some of the multiple output paths of the light path changing module, so that the projection beams pass through different lenses and have different paths after being refracted by different lens. For another example, planes with different reflective indices may be provided respectively in some of the multiple output paths of the light path changing module, so that the projection beams after being reflected by different planes have different paths.

In 204, based on the beam output mode, the projection beams of the target content is projected, via the light path changing module, into the first region of the projection carrier which is located away from the electronic device by a first distance.

The area of the first region varies with the beam output mode.

The light propagation path of the projection beams output based on the adjusted beam output mode is associated with the adjusted beam output mode, so that the area of the projection beams on the projection carrier is different in a different beam output mode.

Optionally, to adjust the beam output mode of the light path changing module accurately and conveniently, in this embodiment, the refractive index of the light path changing module in the direction in which the projection beams are to be projected may be adjusted to be the target refractive index or the target reflective index based on the beam changing parameter. In this way, after the projection beams of the target content is projected, the projection beams in the projection direction is refracted or reflected as predetermined by the light path changing module.

It is to be noted that, the adjusting the refractive index of the light path changing module in the direction in which projection beams are to be projected to be the target refractive index or the target reflective index may include: adjusting the direction of the light path changing module so that the refractive index of the light path changing module in the light transmitting path with the direction in which the projection beams are to be projected is the target refractive index or the target reflective index, or providing the micro projection assembly with multiple light projection outlets and aligning different light projection outlets with inlets of different light output paths of the light path changing module, so that the outlet of the micro projection assembly for the projection beam is determined based on the current beam output mode. In practice, the micro projection assembly may also be provided with a single light projection outlet, and the direction of the micro projection assembly is adjustable, so that the light projection outlet is aligned with different light path transmission paths of the light path changing module.

Optionally, in an embodiment of the application, to make sure the light path changing module have different reflective indices, the light path changing module is a polyhedron having surfaces with different reflective indices, for design concision. In the case where the beam changing parameter includes the projection beams being reflected and the target reflective index thereof, one of the surfaces of the polyhedron with the reflective index being the target reflective index is set as a surface onto which the projection beams are to be projected, and the surface onto which the projection beams are to be projected is adjusted to be in the direction in which the projection beams are to be projected, for example, the polyhedron is rotated so that the surface onto which the projection beams are to be projected is aligned with the projection outlet of the projection beams. In this way, when the projection beams of the target content are projected, the projection beams are projected onto the surface onto which the projection beams are to be projected and then are reflected, thereby changing the projection path of the projection beams. For example, the light path changing module may be a cube, which has surfaces with different reflective indices. For example, surfaces of the cube may be attached with reflective films with different reflective indices. In this way, the projection beams may be projected onto different surfaces of the cube as required, to change the light propagation path, thereby making the area of the projection of the projection beams output from the electronic device variable finally.

In an embodiment of the application, to make sure the light path changing module has different refractive indices, the light path changing module may be an electro-refractive index changing typed light transmitting body. In the case where the beam changing parameter includes the projection beams being refracted and the target refractive index thereof, a voltage applied on the light transmitting body may be adjusted to be a target voltage based on the target refractive index, to adjust the refractive index of the light transmitting body at the target voltage to be the target refractive index, so that the refractive index of the light transmitting body after being applied with the target voltage is the target refractive index. In practice, it is to be appreciated that, the light transmitting body may not be applied with a voltage, i.e., is applied with a zero voltage, so that the light transmitting body has a refractive index without a voltage applied.

The light transmitting body may have any shape. Optionally, the light transmitting body may have at least one pair of surfaces being a light transmitting surface. The pair of surfaces include two opposite surfaces of the polyhedron. For example, the light transmitting body may be a cube, a cuboid or the like. After the target refractive index is determined, the voltage applied on the light transmitting body may be set as the target voltage, and the direction in which the projection beams are to be projected is adjusted to be identical to a direction in which the pair of the light transmitting surfaces of the light transmitting body are located. In practice, if each of the surfaces of the light transmitting body is a light transmitting surface, the projection beams to be projected may be adjusted to be directed to any one of the surfaces of the light transmitting body after the voltage is applied.

Further, to make sure that the light transmitting body is able to reflect and refract the projection beams, the transmitting body may have at least one surface being the light reflecting surface in addition to having at least one pair of surfaces being the light transmitting surface. Also, the different light reflecting surfaces of the light transmitting body have different reflective indices. For example, different surfaces of the light transmitting body may be attached with reflective films with different reflective indices. The beam changing parameter may further include the projection beams being reflected and a target reflective index thereof. If the current beam changing parameter includes the projection beams being reflected and the reflective index thereof being the target reflective index, a target reflecting surface is determined among the at least one light reflecting surface based on the target reflective index and the direction in which the projection beams are to be projected is adjusted to be toward the target reflecting surface. The reflective index of the target reflecting surface is the target reflective index.

It is to be appreciated that, in the case where the light transmitting body is the electro-refractive index changing typed light transmitting body with at least one surface being the reflecting surface, the light transmitting body may also be any three-dimensional body with multiple surfaces, and the three-dimensional body may be a regular structural body or an irregular structural body.

Figure 3:
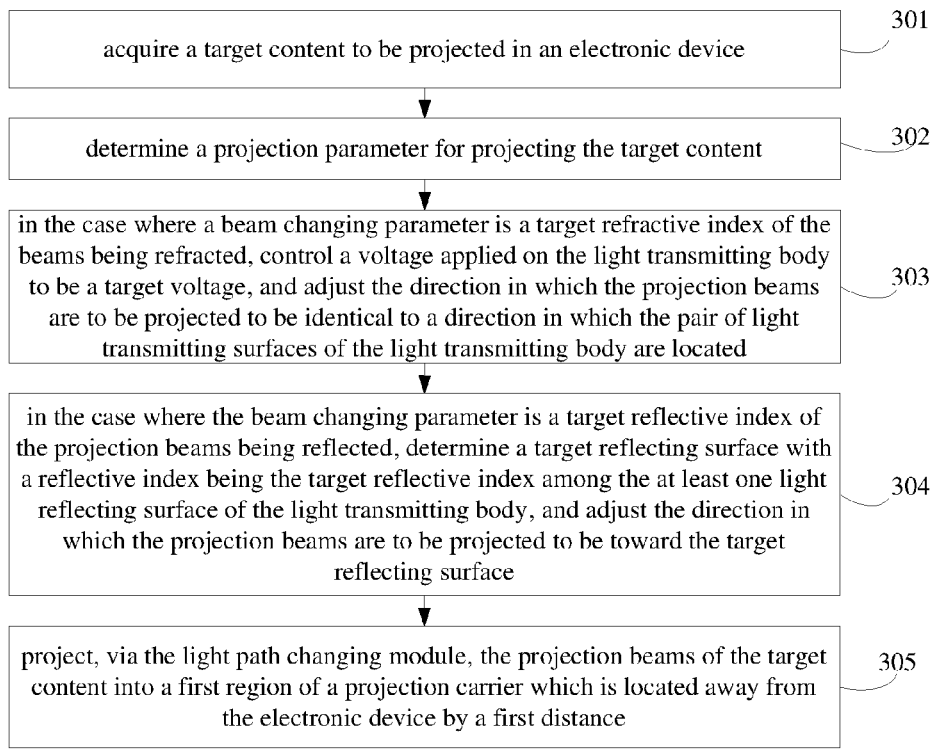
FIG. 3 shows a schematic flowchart of another embodiment of a projection method according to the application.

Hereinafter, by taking a possible three-dimensional structure of the light transmitting body as an example, the process for changing the area of the projection based on the light transmitting body is described. Referring to FIG. 3, which shows a schematic flowchart of another embodiment of a projection method according to the application, the method in this embodiment may include steps 301 to 305 as follows.

In 301, a target content to be projected in an electronic device is acquired.

In 302, a beam changing parameter of projection beams of the target content at the light path changing module is determined.

The beam changing parameter includes the projection beams being refracted and a target refractive index thereof, or the projection beams being reflected and a target reflective index thereof.

It is to be appreciated that, the beam changing parameter may be input or set by a user. The user adjusts the refractive index or the reflective index via a specific key or keys to adjust the area of the projection. In practice, the user may hope to adjust the area of the projection more easily, a key or keys for adjusting the area of the projection may be provided on the electronic device. By pressing or adjusting the key(s), the user may trigger the electronic device to determine the area of the projection set by the operation of the user, and determine the refractive index corresponding to the area of the projection.

In 303, in the case where a beam changing parameter is a target refractive index for the beam being refracted, a voltage applied on the light transmitting body is controlled to be a target voltage, and the direction in which the projection beams are to be projected is adjusted to be identical to the direction where the pair of light transmitting surfaces of the light transmitting body are located.

The voltage of the light transmitting body is recorded as the target voltage, to set the refractive index of the light transmitting body as the target refractive index.

Figure 4:
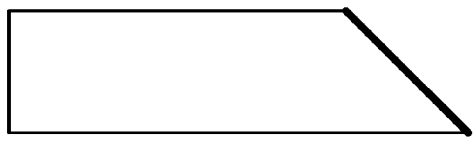
FIG. 4 shows a schematic front view of a light transmitting body according to the application.

As shown in FIG. 4, a schematic front view of a light transmitting body according to the application is shown. As can be seen, the light transmitting body is a right trapezoid prism with one surface being an inclined surface. The inclined surface is attached with a reflective film, so that the inclined surface reflects the projection beams. Other surfaces of the right trapezoid prism are light transmitting surfaces, and the right trapezoid prism is an electro-refractive index changing typed prism. After adjusting the voltage applied on the right trapezoid prism to adjust the refractive index of the right trapezoid prism to be the target refractive index, any one of the other surfaces of the right trapezoid prism may be adjusted to face the projection outlet of the micro projection assembly, so that the projection beams after being output in the projection direction is refracted by the right trapezoid prism.

Figure 5A:
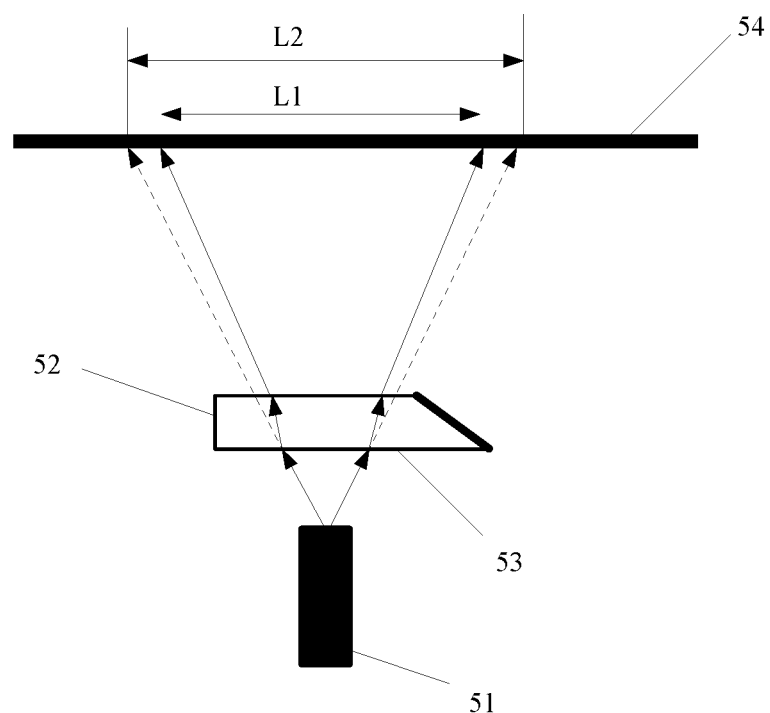
FIG. 5a and FIG. 5b show respectively schematic diagrams of two projection modes according to the application.

Referring to FIG. 5a, a schematic diagram of a direct projection mode of the micro projection assembly is shown for a better understanding. In this projection mode, the projection outlet of the micro projection assembly 51 faces a light transmitting surface 53 of the right trapezoid prism 52. The projection beams projected from the micro projection assembly 51 are refracted by the right trapezoid prism 52, so that a projection beam plane where the projection beams are located is reduced, thereby reducing the area of the projection on the projection screen 54.

As shown in FIG. 5a, a projection beam plane consisting of the projection beams after the projection beams being refracted by the right trapezoid prism is denoted by the solid lines, and the diameter L1 of the projection region of the target content on the projection screen is denoted by the distance between the two intersection points of the two curves and the screen.

A region of a projection beam plane consisting of the projection beams without being refracted by the right trapezoid prism is denoted by the dashed lines, and the diameter of the area of the projection of the projection beams on the projection screen is L2.

The difference between L1 and L2 may be calculated as follows:

$$L2 - L1 = 2d\left[1 - \frac{\cos I}{n\sqrt{1 - n^2 \sin^2 I}}\right]$$

Where d denotes the thickness of the right trapezoid prism; I denotes the angle between the projection beams projected from the micro projection assembly and the normal of the projection surface of the right trapezoid prism, with the projection surface being the light transmitting surface 53; and n denotes the refractive index of the right trapezoid prism. It can be seen from the above equation that, in the case where the refractive index is adjustable, the difference between L2 and L1 is variable, that is, the area of the projection of the target content on the projection screen is variable.

In 304, in the case where the beam changing parameter is a target reflective index for the projection beams being reflected, a target reflecting surface with a reflective index being the target reflective index is determined among the at least one light reflecting surface of the light transmitting body, and the direction in which the projection beams are to be projected is adjusted to be toward the target reflecting surface.

Figure 5B:
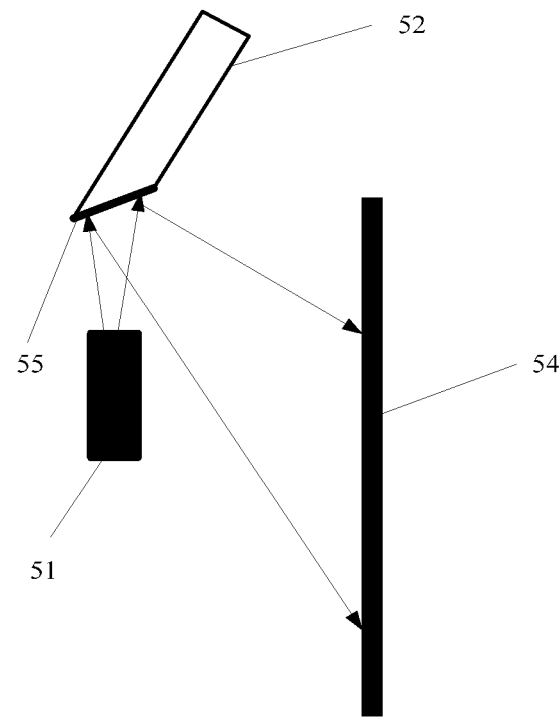

The light transmitting body being the right trapezoid prism as shown in FIG. 4 is still taken as an example. As shown in FIG. 5b, in the case where the projection beams are to be reflected by using the right trapezoid prism, the projection outlet of the micro projection assembly 51 may be adjusted to face the inclined surface 55 of the right trapezoid prism 52. The projection beams projected from the micro projection assembly 51 are reflected by the inclined surface of the right trapezoid prism 52, so that the area of the projection of the projection beams is different from that in FIG. 5a. As shown in FIG. 5b, the region between the projection beams and the projection screen 54 is the projection region. It is to be appreciated that, the area of the projection varies with the incline degree of the inclined surface.

In 305, the projection beams of the target content is projected, via the light path changing module, into a first region of a projection carrier which is located away from the electronic device by a first distance.

The area of the first region varies with the light change of the projection beams caused by the light transmitting body.

In another aspect, a projection apparatus is provided in the application based on the projection method in the application.

Figure 6:
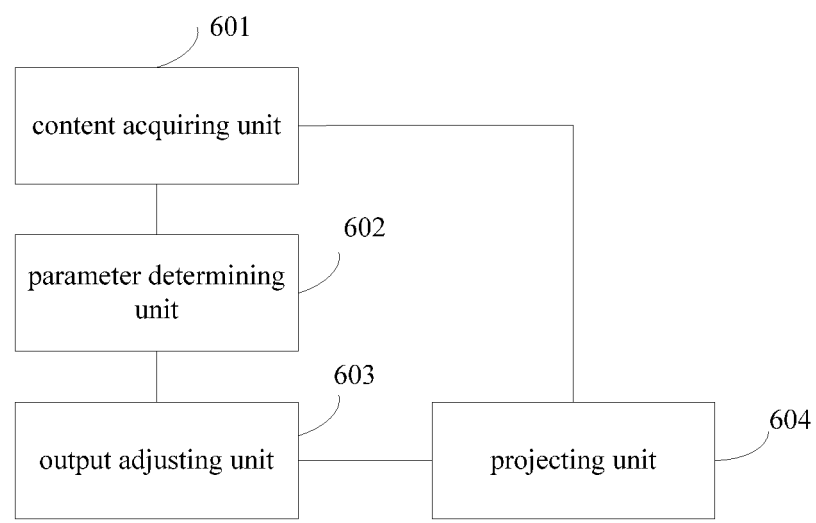
FIG. 6 shows a schematic structural diagram of an embodiment of a projection apparatus according to the application.

Referring to FIG. 6, which shows a schematic structural diagram of an embodiment of a projection apparatus according to the application, the projection apparatus in this embodiment may include a content acquiring unit 601, a parameter determining unit 602, an output adjusting unit 603 and projecting unit 604.

The content acquiring unit 601 is configured to acquire a target content to be projected in an electronic device.

The parameter determining unit 602 is configured to determine a projection parameter for projecting the target content.

The output adjusting unit 603 is configured to adjust a beam output mode of a light path changing module for projection beams of the target content based on the projection parameter.

The projecting unit 604 is configured to, based on the beam output mode, project, via the light path changing module, the projection beams of the target content into a first region of a projection carrier which is located away from the electronic device by a first distance, wherein the area of the first region varies with the beam output mode.

Optionally, the light path changing module may have multiple refractive indices and/or reflective indices; and the parameter determining unit may include a parameter determining sub-unit.

The parameter determining sub-unit is configured to determine a beam changing parameter of the projection beams of the target content at the light path changing module, where the beam changing parameter may include the projection beams being refracted and a target refractive index thereof, or the projection beams being reflected and a target reflective index thereof.

With this, the output adjusting unit may optionally include an output direction adjusting unit.

The output direction adjusting unit is configured to, based on the beam changing parameter, adjust, to be the target refractive index or the target reflective index, the refractive index of the light path changing module in a direction in which the projection beams are to be projected.

Further, in the case where the light path changing module has multiple refractive indices and/or reflective indices, the light path changing module may be an electro-refractive index changing typed light transmitting body; the beam changing parameter determined by the parameter determining sub-unit may include the projection beams being refracted and a target refractive index thereof; and the output adjusting unit may include a first output adjusting unit.

The first output adjusting unit is configured to adjust a voltage applied on the light transmitting body to be a target voltage based on the target refractive index, to adjust the refractive index of the light transmitting body at the target voltage to be the target refractive index.

Optionally, the light transmitting body may be a polyhedron, and the light transmitting body may have at least one pair of surfaces being a light transmitting surface, with the pair of surfaces consisting of two opposite surfaces of the polyhedron. Correspondingly, the first output adjusting unit may include a first output adjusting sub-unit.

The first output adjusting sub-unit is configured to set the voltage applied on the light transmitting body to be the target voltage based on the target refractive index and adjust the direction in which the projection beams are to be projected to be identical to a direction in which the pair of light transmitting surfaces of the light transmitting body are located.

With this, the light transmitting body may optionally have at least one surface being a light reflecting surface;

the beam changing parameter may include the projection beams being reflected and a target reflective index thereof; and the first output adjusting unit may further include a second output adjusting sub-unit configured to determine a target reflecting surface among the at least one light reflecting surface based on the target reflective index, and adjust the direction in which the projection beams are to be projected to be toward the target reflecting surface.

Optionally, in the case where light path changing module has multiple refractive indices and/or reflective indices, the light path changing module may be a polyhedron having surfaces with different reflective indices;

the beam changing parameter may include the projection beams being reflected and a target reflective index thereof; and the output adjusting unit may include a second output adjusting unit.

The second output adjusting unit is configured to set one surface of the polyhedron with a reflective index being the target reflective index as the surface on which the projection beams are to be projected, and adjust the surface on which the projection beams are to be projected to be in the direction in which the projection beams are to be projected.

Figure 7:
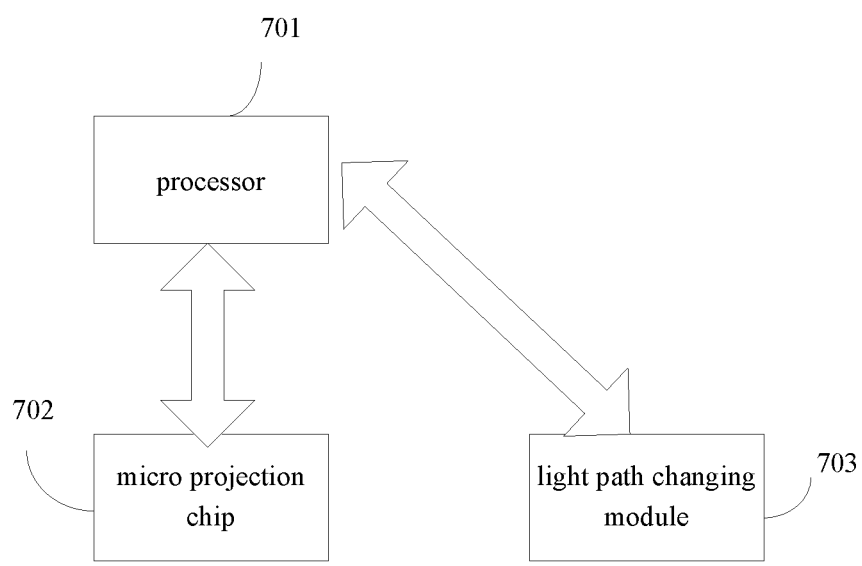
FIG. 7 shows a schematic structural diagram of an embodiment of an electronic device according to the application.

In another aspect, an electronic device is further provided in the application. Referring to FIG. 7, which shows a schematic structural diagram of an embodiment of an electronic device according to the application, the electronic device in this embodiment may include a processor 701, a micro projection chip 702, a light projection outlet and a light path changing module 703 provided in the electronic device and facing the light projection outlet, where the processor 701 is connected to the micro projection chip 702 and the light path changing module 703. The light projection outlet is not shown in the drawing, and may be an outlet provided at any position on the electronic device and capable of transmitting light. In practice, a flashlight outlet provided in the electronic device may also be reused as the light projection outlet.

The processor 701 is configured to acquire a target content to be projected in the electronic device and determine a projection parameter for the target content, adjust a beam output mode of the light path changing module for projection beams of the target content based on the projection parameter, and control, based on the beam output mode, the micro projection chip to project the target content.

The micro projection chip 702 is configured to, under the control of the processor, project the projection beams of the target content into a first region of a projection carrier which is located away from the electronic device by a first distance via the light path changing module and the light projection outlet, where the area of the first region varies with the beam output mode.

It is to be appreciated that, the electronic device in this application may be a tablet computer, a handheld computer or the like.

Optionally, the light path changing module may be an electro-refractive index changing typed light transmitting body;

the projection parameter may include the projection beams being refracted via the light path changing module and a target refractive index thereof; and the processor being configured to adjust a beam output mode of the light path changing module for the projection beams of the target content based on the projection parameter may include the processor being configured to adjust a voltage applied on the light transmitting body to be a target voltage based on the target refractive index, to adjust the refractive index of the light transmitting body at the target voltage to be the target refractive index.

With this, the light transmitting body may optionally be a polyhedron, and the light transmitting body may have at least one pair of surfaces being a light transmitting surface, with the pair of surfaces including two opposite surfaces of the polyhedron; and the processor being configured to adjust the voltage applied on the light transmitting body to be the target voltage based on the target refractive index may include the processor being configured to set the voltage applied on the light transmitting body to be the target voltage based on the target refractive index and adjust the pair of light transmitting surfaces of the light transmitting body to be toward the direction in which the projection beams are to be projected.

Optionally, the light transmitting body may have at least one surface being a light reflecting surface;

the beam changing parameter may further include the projection beams being reflected and a target reflective index thereof; and the processor being configured to adjust the beam output mode of the light path changing module for the projection beams of the target content based on the projection parameter may further include determining a target reflecting surface among the at least one light reflecting surface based on the target reflective index and adjusting the direction in which the projection beams are to be projected to be toward the target reflecting surface.

Optionally, in the case where the light path changing module has multiple refractive indices and/or reflective indices, the light path changing module may be a polyhedron having surfaces with different reflective indices;

the beam changing parameter may include the projection beams being reflected and a target reflective index thereof; and the processor may be configured to set one surface of the polyhedron with a reflective index being the target reflective index as the surface on which the projection beams are to be projected, and adjust the surface on which the projection beams are to be projected to be in the direction in which the projection beams are to be projected.

It should be noted that, the embodiments in this specification are described in a progressive way, each of which emphasizes the differences from others, and the same or similar parts among the embodiments can be referred to each other. Since the device or the system disclosed in the embodiments corresponds to the method therein, the description thereof is relatively simple, and for relevant matters references may be made to the description of the method.

With the above descriptions of the disclosed embodiments, the skilled in the art may practice or use the present application. Various modifications to the embodiments are apparent for the skilled in the art. The general principle suggested herein can be implemented in other embodiments without departing from the spirit or scope of the application. Therefore, the present application should not be limited to the embodiments disclosed herein, but has the widest scope that is conformity with the principle and the novel features disclosed herein.

The invention claimed is:

1. A projection method, comprising:
acquiring a target content to be projected in an electronic device;
determining a projection parameter for projecting the target content, wherein the projection parameter comprises a beam changing parameter of projection beams of the target content at a light path changing module, wherein the light path changing module has a plurality of refractive indices or reflective indices, and the beam changing parameter comprises the projection beams being refracted and a target refractive index thereof, or the projection beams being reflected and a target reflective index thereof;
adjusting a beam output mode of the light path changing module for projection beams of the target content based on the projection parameter; and
based on the beam output mode, projecting, via the light path changing module, the projection beams of the target content into a first region of a projection carrier which is located away from the electronic device by a first distance, wherein the area of the first region varies with the beam output mode.

2. The projection method according to claim 1, wherein the adjusting the beam output mode of the light path changing module for the projection beams of the target content based on the projection parameter comprises:
based on the beam changing parameter, adjusting, to be the target refractive index or the target reflective index, the refractive index of the light path changing module in a direction in which the projection beams are to be projected.

3. The projection method according to claim 1, wherein the light path changing module is an electro-refractive index changing typed light transmitting body;
the beam changing parameter comprises the projection beams being refracted and a target refractive index thereof; and
the adjusting the beam output mode of the light path changing module for the projection beams of the target content based on the projection parameter comprises:
adjusting a voltage applied on the light transmitting body to be a target voltage based on the target refractive index, to adjust the refractive index of the light transmitting body at the target voltage to be the target refractive index.

4. The projection method according to claim 3, wherein the light transmitting body is a polyhedron, and the light transmitting body has at least one pair of surfaces being a light transmitting surface, with the pair of surfaces comprising two opposite surfaces of the polyhedron; and
the adjusting the voltage applied on the light transmitting body to be the target voltage based on the target refractive index, to adjust the refractive index of the light transmitting body at the target voltage to be the target refractive index comprises:
setting the voltage applied on the light transmitting body to be the target voltage based on the target refractive index and adjusting the direction in which the projection beams are to be projected to be identical to a direction in which the pair of light transmitting surfaces of the light transmitting body are located.

5. The projection method according to claim 4, wherein the light transmitting body has at least one surface being a light reflecting surface;
the beam changing parameter further comprises the projection beams being reflected and a target reflective index thereof; and
the adjusting the beam output mode of the light path changing module for the projection beams of the target content based on the projection parameter further comprises:
determining a target reflecting surface among the at least one light reflecting surface based on the target reflective index and adjusting the direction in which the projection beams are to be projected to be toward the target reflecting surface.

6. The projection method according to claim 1, wherein the light path changing module is a polyhedron having surfaces with different reflective indices;
the beam changing parameter comprises the projection beams being reflected and a target reflective index thereof; and
the adjusting the beam output mode of the light path changing module for the projection beams of the target content based on the projection parameter comprises:
setting one surface of the polyhedron with a reflective index being the target reflective index as a surface on which the projection beams are to be projected, and adjusting the surface on which the projection beams are to be projected to be in the direction in which the projection beams are to be projected.

7. A projection apparatus, comprising:
a content acquiring unit configured to acquire a target content to be projected in an electronic device;
a parameter determining unit configured to determine a projection parameter for projecting the target content, wherein the projection parameter comprises a beam changing parameter of projection beams of the target content at a light path changing module, wherein the light path changing module has a plurality of refractive indices or reflective indices, and the beam changing parameter comprises the projection beams being refracted and a target refractive index thereof, or the projection beams being reflected and a target reflective index thereof;
an output adjusting unit configured to adjust a beam output mode of the light path changing module for projection beams of the target content based on the projection parameter; and
a projecting unit configured to, based on the beam output mode, project, via the light path changing module, the projection beams of the target content into a first region of a projection carrier which is located away from the electronic device by a first distance, wherein the area of the first region varies with the beam output mode.

8. The projection apparatus according to claim 7, wherein the output adjusting unit comprises an output direction adjusting unit configured to, based on the beam changing parameter, adjust, to be the target refractive index or the target reflective index, the refractive index of the light path changing module in a direction in which the projection beams are to be projected.

9. The projection apparatus according to claim 7, wherein the light path changing module is an electro-refractive index changing typed light transmitting body;
the beam changing parameter comprises the projection beams being refracted and a target refractive index thereof; and
the output adjusting unit comprises a first output adjusting unit configured to adjust a voltage applied on the light transmitting body to be a target voltage based on the target refractive index, to adjust the refractive index of the light transmitting body at the target voltage to be the target refractive index.

10. The projection apparatus according to claim 9, wherein the light transmitting body is a polyhedron, and the light transmitting body has at least one pair of surfaces being a light transmitting surface, with the pair of surfaces comprising two opposite surfaces of the polyhedron; and
the first output adjusting unit comprises a first output adjusting sub-unit configured to set the voltage applied on the light transmitting body to be the target voltage based on the target refractive index and adjust the direction in which the projection beams are to be projected to be identical to a direction in which the pair of light transmitting surfaces of the light transmitting body are located.

11. The projection apparatus according to claim 10, wherein the light transmitting body has at least one surface being a light reflecting surface;
the beam changing parameter comprises the projection beams being reflected and a target reflective index thereof; and
the first output adjusting unit further comprises a second output adjusting sub-unit configured to determine a target reflecting surface among the at least one light reflecting surface based on the target reflective index and adjust the direction in which the projection beams are to be projected to be toward the target reflecting surface.

12. The projection apparatus according to claim 7, wherein the light path changing module is a polyhedron having surfaces with different reflective indices;
the beam changing parameter comprises the projection beams being reflected and a target reflective index thereof; and
the output adjusting unit comprises a second output adjusting unit configured to set one surface of the polyhedron with a reflective index being the target reflective index as a surface on which the projection beams are to be projected, and adjust the surface on which the projection beams are to be projected to be in the direction in which the projection beams are to be projected.

13. An electronic device, comprising a processor, a micro projection chip, a light projection outlet and a light path changing module provided in the electronic device and facing the light projection outlet, wherein the processor is connected to the micro projection chip and the light path changing module, and the light path changing module is an electro-refractive index changing typed light transmitting body;
the processor is configured to acquire a target content to be projected in the electronic device and determine a projection parameter for the target content, wherein the projection parameter comprises the projection beams being refracted via the light path changing module and a target refractive index thereof, adjust a voltage applied on the light transmitting body to be a target voltage based on the target refractive index, to adjust the refractive index of the light transmitting body at the target voltage to be the target refractive index, and control, based on the beam output mode, the micro projection chip to project the target content; and
the micro projection chip is configured to, under the control of the processor, project the projection beams of the target content into a first region of a projection carrier which is located away from the electronic device by a first distance via the light path changing module and the light projection outlet, wherein the area of the first region varies with the beam output mode.

14. The electronic device according to claim 13, wherein the light transmitting body is a polyhedron, and the light transmitting body has at least one pair of surfaces being a light transmitting surface, with the pair of surfaces comprising two opposite surfaces of the polyhedron; and
the processor being configured to adjust the voltage applied on the light transmitting body to be the target voltage based on the target refractive index comprises the processor being configured to set the voltage applied on the light transmitting body to be the target voltage based on the target refractive index and adjust the pair of light transmitting surfaces of the light transmitting body to be toward the direction in which the projection beams are to be projected.

15. The electronic device according to claim 14, wherein the light transmitting body has at least one surface being a light reflecting surface;
the projection parameter further comprises the projection beams being reflected and a target reflective index thereof; and
the processor being configured to adjust the voltage applied on the light transmitting body to be the target voltage based on the target refractive index further comprises determining a target reflecting surface among the at least one light reflecting surface based on the target reflective index and adjusting the direction in which the projection beams are to be projected to be toward the target reflecting surface.

* * * * *